(12) United States Patent
Mutsuda et al.

(10) Patent No.: US 7,740,943 B2
(45) Date of Patent: Jun. 22, 2010

(54) MOLDED COMPOSITE ARTICLE AND PROCESS FOR PRODUCING THE SAME

(75) Inventors: Mitsuteru Mutsuda, Himeji (JP); Hiroaki Arita, Himeji (JP); Hajime Komada, Himeji (JP); Toru Ikuta, Kobe (JP)

(73) Assignee: Daicel-Evonik Ltd., Tokyo (JP)

( * ) Notice: Subject to any disclaimer, the term of this patent is extended or adjusted under 35 U.S.C. 154(b) by 542 days.

(21) Appl. No.: 11/579,960

(22) PCT Filed: May 1, 2005

(86) PCT No.: PCT/JP2005/008764

§ 371 (c)(1),
(2), (4) Date: Nov. 9, 2006

(87) PCT Pub. No.: WO2005/109994

PCT Pub. Date: Nov. 24, 2005

(65) Prior Publication Data

US 2007/0172670 A1 Jul. 26, 2007

(30) Foreign Application Priority Data

May 17, 2004 (JP) ............... 2004-147042

(51) Int. Cl.
*B29C 45/14* (2006.01)
*B32B 27/24* (2006.01)
*B32B 27/34* (2006.01)
*B32B 27/40* (2006.01)

(52) U.S. Cl. .................. 428/423.1; 36/83; 264/171.1; 264/171.23; 264/171.24; 264/173.16; 264/173.19; 264/174.11; 264/241; 264/244; 428/423.3; 428/423.5; 428/474.4; 525/424

(58) Field of Classification Search ............. 428/423.1, 428/423.3, 423.5, 474.4; 525/424; 264/171.1, 264/171.23, 171.24, 173.16, 173.19, 174.11, 264/241, 244; 36/83
See application file for complete search history.

(56) References Cited

U.S. PATENT DOCUMENTS 5,439,975 A * 8/1995 Jacquemin et al. ............ 525/89
6,749,781 B1 * 6/2004 Maurer ...................... 264/46.4

FOREIGN PATENT DOCUMENTS

| JP | 2-292040 A | 12/1990 |
| JP | 4-363221 A | 12/1992 |
| JP | 8-505333 A | 6/1996 |
| JP | 8-267585 A | 10/1996 |
| WO | WO-95/12481 A1 | 5/1995 |

* cited by examiner

*Primary Examiner*—Ana L Woodward
(74) *Attorney, Agent, or Firm*—Birch, Stewart, Kolasch & Birch, LLP

(57) ABSTRACT

In a molded composite article formed by directly bonding a resin member comprising a polyamide-series resin to a resin member comprising a thermoplastic polyurethane-series resin, the polyamide-series resin comprises a polyamide block copolymer containing (A) a polyether segment having at least one terminal imino group. The polyamide-series resin may comprise a polyamide-series resin having a free amino group in a concentration of not less than about 10 mmol/kg. The molded composite article is producible, for example, by heating at least one of the polyamide-series resin and the thermoplastic polyurethane-series resin to bond the former to the latter. Thus obtained molded composite article is suitable for a member of a shoe and an industrial roll. In such a process, the polyamide-series resin member and the thermoplastic polyurethane-series resin member both of which are different in nature from each other can be directly and firmly bonded together.

19 Claims, No Drawings

MOLDED COMPOSITE ARTICLE AND PROCESS FOR PRODUCING THE SAME

TECHNICAL FIELD

The present invention relates to a molded composite article (composite molded (or shaped) article) in which a resin member comprising a specific polyamide-series resin is bonded to a resin member comprising a thermoplastic polyurethane-series resin in a one-piece construction without an adhesive, and a process for producing the same.

BACKGROUND ART

In order to improve design or decorative property or to impart excellent touch or texture (e.g., soft texture), there have been proposed that composites (molded composite articles) formed from a combination of a plurality of resins each having a different hardness, for example, a molded composite article in which at least part of a resin molded article is coated with a thermoplastic elastomer. Such a molded composite article is usually produced by adhesion of a plurality of molded members through an adhesive. For example, Japanese Patent Application Laid-Open No. 267585/1996 (JP-8-267585A) (Patent Document 1) discloses a resin molded article in which a plurality of resin molded articles formed from a polyamide resin or others are adhered to each other through a finishing agent such as a urethane polymer or a urethane adhesive. However, such a process using an adhesive is not only uneconomical due to complicated steps, but also has problems such as environmental pollution by an organic solvent or others.

On the other hand, from the viewpoint of rationalization of production processes or environmental protection, a process for thermal welding of a plurality of molded members has been adopted. The molded composite article obtained by thermal welding is usually manufactured by a molding process such as a two-color (or double) molding or an insert molding in many cases. However, combination of different materials subjecting to thermal welding is significantly limited. Moreover, it is not easy to establish molding conditions to ensure enough bonded strength.

Therefore, in addition to thermal welding, the fused part is reinforced by a combination use of a process for creating a concavo-convex site (or part) in the composite area of the molded member to bond mechanically, or a process for coating a primer or others on the bonding (or fusing) part, or other methods. In such a method, however, the molded composite article is deteriorated in flexuous property. For example, the hardened primer layer easily forms a crack by bending. Moreover, the production process needs to complicate the structure of the molded member, resulting in increase of the number of the production steps.

In order to solve these problems, it has been investigated to use a thermoplastic polyurethane as a material for a resin member constituting a molded composite article. The thermoplastic polyurethane itself is relatively excellent in adhesiveness. For example, in an application for shoe(s), a molded composite plastic article comprising a polyamide resin and a thermoplastic polyurethane is practically used as a shoe sole. For example, Japanese Patent Application Laid-Open No. 505333/1996 (JP-8-505333A) (Patent Document 2) discloses that a lightened shoe sole is obtained by inserting or putting a molded article made of a thermoplastic resin such as a polyether amide, a polyether ester or a polyurethane in a mold, injection-molding a polyamide elastomer containing a foaming agent into the mold, and adhering the thermoplastic resin molded article (un-lightweight (un-lightened) plastic) to the elastomer (lightweight thermoplastic elastomer).

In such an application for shoe sole, it is preferred to use a member composed of a thermoplastic polyurethane resin excellent in flexibility in terms of securing flexibility of the whole shoe sole. Moreover, as the counterpart member of the polyurethane resin, a member composed of a polyamide elastomer excellent in flexibility is frequently selected. In the compounding process, both members are generally subjected to thermal welding in the molding process. In these cases, the polyamide elastomer composed of a polyamide block copolymer having a polyether segment in a molecule thereof is combined with the thermoplastic polyurethane having a polyether segment in a molecule thereof. Thereby, affinity between polyether segments in common with both resins is attributed to relatively easy thermal welding therebetween.

However, in this method, water management of the materials in the molding process (usually an injection molding) is difficult, and moisture absorption of the material significantly decreases the bonded strength therebetween. Further, the bonded strength is also influenced great deal by the temperature of the resin in the molding process. In the case of insert-molding either of the members, it is possible that the member composed of the polyurethane resin is inserted followed by injecting the polyamide elastomer thereon (overmolding the polyamide elastomer). However, in the reciprocal case, enough bonded strength is unobtainable. The polyamide elastomer is high in heat resistance and can be heated up to a sufficiently high temperature (e.g., 250° C.) in the injection molding, but the polyurethane can be heated only up to about 200° C. because of poor heat resistance thereof. The reason is that the melting point of the polyamide elastomer is generally higher than that of the polyurethane elastomer. Accordingly, the above combination had the problem that economically disadvantageous multi-color molding machine was forced to be employed.

Further, as mentioned above, since the bonding of this combination depends on affinity between polyether segments in common with both resins, it is drastically difficult to combine a polyurethane having a small content of the polyether segment, particularly a costly advantageous polyester-series polyurethane, with a polyamide elastomer, and therefore commercially disadvantageous factors have been severely left.

Patent Document 1: JP-8-267585A
Patent Document 2: JP-8-505333A

DISCLOSURE OF THE INVENTION

Problems to be Solved by the Invention

It is therefore an object of the present invention to provide a molded composite article in which a resin member comprising an extensive thermoplastic polyurethane-series resin is directly and firmly bonded to a resin member comprising a flexible polyamide-series resin without an adhesive.

It is another object of the present invention to provide a process for producing a molded composite article in which a resin member comprising a flexible polyamide-series resin and a resin member comprising a thermoplastic polyurethane-series resin are firmly bonded together by thermal welding in the most rational (economical) manner without going through complicated production steps.

Means to Solve the Problem

The inventors of the present invention made intensive studies to achieve the above objects and finally found that use of a polyamide-series resin which comprises as a main component a polyamide block copolymer having a specific polyether segment realizes high and stable bonded strength between the polyamide-series resin and a wide range of polyurethane-series materials, and that a molded composite article being useful for a shoe member, a roller for industrial instruments, or other members is commercially advantageously producible in a rational and economical process. The present invention was accomplished based on the above findings.

That is, the molded composite article of the present invention is a molded composite article which comprises (Ia) a resin member comprising a polyamide-series resin and (IIa) a resin member which is directly bonded (joined) to the resin member (Ia) and comprises a thermoplastic polyurethane-series resin, wherein the polyamide-series resin comprises a polyamide block copolymer containing (A) a polyether segment having at least one terminal imino group (or having an imino group at least at one terminal (end)) The polyamide block copolymer may comprise a polyamide elastomer. Moreover, the polyether segment (A) maybe, for example, a polyether segment is a polyether segment which is a condensate (condensation product) of a polyhydric alcohol having 2 to 8 carbon atoms (preferably a straight or branched chain aliphatic polyhydric alcohol having 2 to 4 carbon atoms, and more preferably a straight or branched chain aliphatic polyhydric alcohol having 2 to 3 carbon atoms), and has at least one terminal imino group. Moreover, the polyether segment (A) may have a branched chain having a free amino group. The proportion of the polyether segment (A) may be, for example, in the polyamide block copolymer (the polyamide entirety), about 10 to 90% by weight (preferably about 20 to 80% by weight, and more preferably about 25 to 70% by weight). Further, the polyamide-series resin may have a free amino group in a concentration of not less than about 10 mmol/kg, preferably not less than about 20 mmol/kg, more preferably not less than about 30 mmol/kg (e.g., about 45 mmol/kg), or may be a resin composition which comprises a polyamide block copolymer containing the polyether segment (A). Such a polyamide-series resin composition may be, for example, a resin composition which comprises both the polyamide block copolymer containing the polyether segment (A) and (C) a compound having a free amino group. The compound (C) having a free amino group may comprise at least one member selected from the group consisting of a monoamine, a polyamine, a polyamide oligomer and a polyamide-series resin. Moreover, the proportion of the compound (C) having a free amino group may be, in the total resin composition, for example, about 0.01 to 20% by weight, preferably about 0.1 to 15% by weight, and more preferably about 0.5 to 10% by weight (e.g., about 1 to 8% by weight).

The thermoplastic polyurethane-series resin may usually comprise a thermoplastic polyurethane elastomer. Moreover, the thermoplastic polyurethane-series resin may comprise a polyester polyurethane obtainable from a polyester diol. Such a thermoplastic polyurethane-series resin may comprise, for example, at least one member selected from the group consisting of a polyether urethane elastomer, a polyester ether urethane elastomer, and a polycarbonate urethane elastomer. The molded composite article of the present invention is useful for a variety of members, for example, may be a member of a shoe or a roll.

The molded composite article may be produced, for example, by heating at least one selected from the group consisting of (i) the polyamide-series resin or a resin member thereof (Ia) and (ii) the thermoplastic polyurethane-series resin or a resin member thereof (IIa) to bond the former (i) to the latter (ii). More specifically, the process may comprise (a) heating the thermoplastic polyurethane-series resin to be molten (fused or melted) with bringing the thermoplastic polyurethane-series resin in the molten state into contact with at least part of a resin member comprising the polyamide-series resin to bond both resins together, (b) heating the polyamide-series resin to be molten with bringing the polyamide-series resin in the molten (fused or melted) state into contact with at least part of a resin member comprising the thermoplastic polyurethane-series resin to bond the polyamide-series resin to the thermoplastic polyurethane resin member, or (c) heating both of the polyamide-series resin and the thermoplastic polyurethane-series resin to be molten with bringing the polyamide-series resin in the molten state into contact with the thermoplastic polyurethane-series resin in the molten state to bond both resins together. Further, the polyamide-series resin and the thermoplastic polyurethane-series resin may be bonded together in the molding process by a molding method selected from the group consisting of a heat press molding, a vacuum molding, an injection molding, an extrusion molding, and a blow molding.

Incidentally, throughout this specification, the meaning of the term "resin" includes "a resin composition". Moreover, throughout this specification, the term "adhesion (or adhering)" means a technique for compounding a plurality of members through an adhesive, the term "bonding (or joining)" means a technique for compounding a plurality of members without an adhesive, and the both terms are distinguished from each other. Welding (or thermal welding or fusing) is one embodiment of bonding.

Effects of the Invention

According to the present invention, since a specific polyamide-series resin is combined with a thermoplastic polyurethane-series resin, a resin member comprising an extensive thermoplastic polyurethane-series resin is directly and firmly can be bonded or joined to a resin member comprising a flexible polyamide-series resin without an adhesive. Therefore, even if using members which are different in characteristics from each other, i.e., the resin member comprising a polyamide-series resin and the resin member comprising a thermoplastic polyurethane-series resin, these resin members are directly and firmly bondable or joinable together without an adhesive. Moreover, in a most rational (economical) manner without going through complicated production steps, a molded composite article is producible in which a resin member comprising a flexible polyamide-series resin and a resin member comprising a thermoplastic polyurethane-series resin are firmly thermal-welded together.

DETAILED DESCRIPTION OF THE INVENTION

The molded composite article of the present invention comprises (Ia) a resin member comprising a polyamide-series resin and (IIa) a resin member which is directly bonded to the resin member (Ia) and comprises a thermoplastic polyurethane-series resin.

(Polyamide-series Resin)

The polyamide-series resin used in the present invention comprises a polyamide block copolymer which comprises a polyamide-block copolymer containing (A) a polyether segment having at least one terminal imino group (or has an imino group at least at one terminal) (e.g., at both terminals, at least two terminals, hereinafter, sometimes inclusively referred to as both terminals). Hereinafter such a polyamide block copolymer containing the polyether segment (A) is sometimes referred to as simply a polyamide block copolymer, or a polyamide block copolymer having an imino group. The polyamide block copolymer (including a polyamide block copolymer having an imino group) may be usually a polyamide elastomer. More specifically, the polyamide copolymer may comprise a polyamide elastomer which comprises (B) a polyamide chain as a hard segment, and a polyether chain (the polyether segment (A)) as a soft segment. Incidentally, in the present description, the term "block" means a block or segment containing a repeating unit, and is not necessary to be a block having a long repeating unit.

The polyamide chain (B) constituting a hard block (a hard segment) of the polyamide block copolymer (a polyamide block copolymer having an imino group) may comprise a monomer arrangement similar to an arrangement of a conventional polyamide-series resin (or a polyamide, a polyamide unit, a polyamide segment), for example, an aliphatic polyamide-series resin (an aliphatic polyamide), an alicyclic polyamide-series resin (an alicyclic polyamide), an aromatic polyamide-series resin (an aromatic polyamide), and other polyamides. Such a polyamide chain (B) (a hard segment) may be a homopolyamide or a copolyamide.

Among the hard segments comprising the aliphatic polyamide, the homopolyamide segment may include a condensate (condensation product) of an aliphatic diamine component [e.g., a $C_{4-16}$alkylenediamine such as tetramethylenediamine, hexamethylenediamine or dodecanediamine (preferably a $C_{4-14}$alkylenediamine, particularly a $C_{6-12}$alkylenediamine)] and an aliphatic dicarboxylic acid component [e.g., an alkanedicarboxylic acid having about 4 to 20 carbon atoms, such as adipic acid, sebacic acid, or dodecanedioic acid (preferably a $C_{4-16}$alkanedicarboxylic acid, and particularly a $C_{6-14}$alkanedicarboxylic acid)], for example, a polyamide 46, a polyamide 66, a polyamide 610, a polyamide 612, and a polyamide 1010;a homopolyamide of a lactam [e.g., a lactam having about 4 to 20 (preferably about 4 to 16) carbon atoms, such as ε-caprolactam or ω-laurolactam] or an aminocarboxylic acid [e.g., an aminocarboxylic acid having about 4 to 20 (preferably about 4 to 16) carbon atoms, such as ω-aminoundecanoic acid], for example, a polyamide 6, a polyamide 11, and a polyamide 12;and others.

Moreover, the copolyamide segment may include a copolyamide which is a copolymer of constitutive components of the homopolyamide segment (e.g., the aliphatic diamine components, the aliphatic dicarboxylic acid components, the lactams and the aminocarboxylic acids). Examples of the copolyamide may include a copolymer of 6-aminocaproic acid and 12-aminododecanoic acid; a copolymer of 6-aminocaproic acid, 12-aminododecanoic acid, hexamethylenediamine and adipic acid; a copolymer of hexamethylenediamine, adipic acid, hydrogenated dimer acid and 12-aminododecanoic acid; a polyamide 6/11; a polyamide 6/12; a polyamide 66/11; a polyamide 66/12; and others.

The hard segment comprising the alicyclic polyamide may include a homopolyamide or copolyamide having at least one component selected from the group consisting of at least an alicyclic diamine and an alicyclic dicarboxylic acid as a constitutive component. For example, there may be mentioned an alicyclic polyamide obtained from an alicyclic diamine and/ or an alicyclic dicarboxylic acid as at least part of one component among a diamine component and a dicarboxylic acid component each constituting the polyamide. As the diamine component and the dicarboxylic acid component, the above-mentioned aliphatic diamine(s) and/or aliphatic dicarboxylic acid(s) are preferably used in combination with the above-mentioned alicyclic diamine(s) and/or alicyclic dicarboxylic acid(s). Such a resin comprising the alicyclic polyamide generally has high transparency, and is known as a so-called transparent polyamide. Examples of the alicyclic diamine may include a diaminocycloalkane such as diaminocyclohexane (e.g., a diamino$C_{5-10}$cycloalkane); a bis(aminocycloalkyl)alkane such as bis(4-aminocyclohexyl)methane, bis(4-amino-3-methylcyclohexyl)methane or 2,2-bis(4'-aminocyclohexyl)propane [e.g., a bis(amino$C_{5-8}$cycloalkyl)$C_{1-3}$alkane]; and others. Moreover, the alicyclic dicarboxylic acid may include a cycloalkanedicarboxylic acid such as cyclohexane-1,4-dicarboxylic acid or cyclohexane-1,3-dicarboxylic acid (for example, a $C_{5-10}$cycloalkane-dicarboxylic acid) and others.

The aromatic polyamide-series segment may include a polyamide in which at least one component of the diamine component (e.g., an aliphatic diamine component) and the dicarboxylic acid component (e.g., an aliphatic dicarboxylic acid component) comprises an aromatic component, for example, a polyamide having an aromatic component in part or whole of the diamine component(s) [for example, a condensation product of an aromatic diamine (e.g., metaxylylenediamine) and an aliphatic dicarboxylic acid, such as MXD-6], a polyamide having an aromatic component in part or whole of the dicarboxylic acid component [e.g., a condensation product of an aliphatic diamine (e.g., trimethylhexamethylenediamine) and an aromatic dicarboxylic acid (e.g., terephthalic acid, isophthalic acid)], and others.

The polyamide segment (a hard segment) may further include a polyamide in which a dimeric acid is used as the dicarboxylic acid component, a polyamide in which a branched chain structure is introduced by using a small amount of a polyfunctional polyamine and/or polycarboxylic acid component, a modified polyamide (e.g., an N-alkoxymethylpolyamide), a polyamide block copolymer, and other polyamides.

The polyamide segment (a hard segment) may comprise a hard segment(s) singly or in combination of not less than two species.

Among a variety of polyamides exemplified above, as a polyamide more suitably adaptable as a polyamide chain (B) constituting the hard segment of the polyamide block copolymer (a polyamide copolymer having an imino group), there may be exemplified an aliphatic polyamide (a homopolyamide, a copolyamide), and the like. The monomer of the polyamide (e.g., a diamine, a dicarboxylic acid, and an aminocarboxylic acid) may have carbon atoms in the range of about 6 to 12.

The polyether segment (A) is usually a polyether segment which is a condensate (condensation product) of a polyhydric alcohol (e.g., a diol such as an aliphatic diol) and has at least one terminal imino group. More specifically, "(A) a polyether segment having imino groups at both terminals" constituting the soft block (soft segment) of the polyamide block copolymer employs, as a precursor, a condensation product (condensate) of a polyhydric alcohol having at least one terminal amino group (e.g., at both terminals, and at least two terminals), that is, a polyether (e.g., an aliphatic homopolyether, an aliphatic copolyether, or a mixture thereof) having at least one terminal amino group (e.g., both terminals). More specifically, the polyamide block copolymer may be obtained by a condensation (copolymerization or copolycondensation) of the hard segment [or a constitutive component thereof (e.g., a diamine component, a dicarboxylic acid component, a lactam or an aminocarboxylic acid)] with a polyether having at least one terminal amino group (or two terminals) (or a polyether component, hereinafter sometimes referred to as simply a polyether). For example, the polyamide block copolymer may be (i) a block copolymer obtained by a condensation of a hard segment having a carboxyl group at terminal(s) (e.g., an aliphatic polyamide having at least one terminal carboxyl group) with a polyether component, or (ii) a block copolymer obtained by a condensation (copolycondensation) of a polyether component and a constitutive component of the hard segment [e.g., a component containing a dicarboxylic acid component (e.g., at least one member selected from the group consisting of an aliphatic dicarboxylic acid, an alicyclic dicarboxylic acid and an aromatic dicarboxylic acid, particularly an aliphatic dicarboxylic acid) and a diamine component (e.g., at least one member selected from the group consisting of an aliphatic diamine, an alicyclic diamine and an aromatic diamine), a lactam, or an aminocarboxylic acid].

As a polyether constituting the polyether segment (A), or a precursor of the polyether segment (A), there may be mentioned an aliphatic polyether, an alicyclic polyether, an aromatic polyether, and others. The polyethers may be used singly or in combination.

As the aliphatic polyether, there may be mentioned an aliphatic polyether or an aliphatic poly(oxy)alkylene glycol) which is a condensation product of a polyhydric alcohol such as an aliphatic polyhydric alcohol (an aliphatic diol) [e.g., an aliphatic diol (diol component) having about 2 to 18 carbon atoms, for example, a straight chain aliphatic diol (e.g., ethylene glycol, trimethylene glycol, and tetramethylene glycol), and a branched aliphatic diol (e.g., propylene glycol, 2-methyl-1,3-propanediol, 3-methyl-1,5-pentanediol, 2-methyl-1,8-octanediol, 2,2-diethyl-1,3-propanediol, and 1,9-nonanediol)], and others. Moreover, the aliphatic polyether may be a copolyether, and such an aliphatic copolyether may include a condensation product (copolycondensation product or copolymer, that is, an aliphatic copolyether) of different species of aliphatic diols among these aliphatic diols, in addition, a condensation product (copolycondensation product or copolymer) of the aliphatic diol with the after-mentioned alicyclic or aromatic diol, a condensation product (copolycondensation product or copolymer) of the aliphatic diol with a polyhydric alcohol, and others. Such a polyhydric alcohol may include a polyol such as the above-exemplified polyhydric alcohols for the homopolyether (e.g., diethylene glycol, a polyethylene glycol, and a polypropylene glycol), further, a polyhydric alcohol being tri- to polyfunctional (e.g., about tri- to octafunctional, preferably about tri- to hexafunctional) or a condensation product thereof [e.g., an alkanepolyol (e.g., a $C_{3-8}$alkanetriol such as glycerin, trimethylolethane, or trimethylolpropane, a $C_{4-10}$alkanetetraol such as pentaerythritol), a condensation product of an alkanepolyol (e.g., diglycerin, ditrimethylolpropane, dipentaerythritol, and polyglycerin)], and others. These polyhydric alcohols may be used singly or in combination.

Among the aliphatic polyethers, in the present invention, from the viewpoint of achievement in higher bonded strength of the molded composite article, the preferred (advantageous) aliphatic polyether includes a condensation product of a straight or branched chain aliphatic polyhydric alcohol having not more than 8 carbon atoms (e.g., 2 to 8 carbon atoms), preferably not more than 4 carbon atoms (e.g., 2 to 4 carbon atoms), more preferably not more than 3 carbon atoms (e.g., 2 to 3 carbon atoms) (and, if necessary, further a polyhydric alcohol being tri- to polyfunctional, or a condensation product thereof).

As the alicyclic polyether, there may be mentioned an alicyclic homopolyether such as a condensation product of an alicyclic polyhydric alcohol (e.g., a $C_{5-10}$cycloalkanediol such as cyclohexanediol or cyclohexane dimethanol, preferably a $C_{5-8}$cycloalkanediol); an alicyclic copolyether such as a condensation product (a copolycondensation product or a copolymer) of the above-mentioned alicyclic polyhydric alcohol with a copolycondensation component (e.g., an alicyclic diol different from the alicyclic polyhydric alcohol, and the above-mentioned polyhydric alcohol being tri- to polyfunctional); and others. Moreover, as the aromatic polyether, there may be mentioned an aromatic homopolyether such as a condensation product of an aromatic polyhydric alcohol [e.g., a dihydroxyarene which may have a substituent (e.g., a dihydroxy$C_{6-12}$arene such as a dihydroxybenzene, a dihydroxytoluene, or a dihydroxybiphenyl), a bisarylalkane which may have a substituent (e.g., a bis(hydroxy$C_{6-10}$aryl) straight or branched chain $C_{1-4}$alkane such as bisphenol A)], an aromatic copolyether such as a condensation product (a copolycondensation product or a copolymer) of the above-mentioned aromatic polyhydric alcohol with a copolycondensation component (e.g., an aromatic diol different from the aromatic polyhydric alcohol, and the above-mentioned polyhydric alcohol being tri- to polyfunctional), and others. Incidentally, the alicyclic polyhydric alcohol (or the alicyclic polyether) or the aromatic polyhydric alcohol (or the aromatic polyether) each having amino groups at both terminals may be an aimed component in the present invention. However, these compounds are difficult in synthesis, in addition, these compounds deteriorates in flexibility. Therefore, these compounds are practically used as a copolymerization component with the aliphatic polyhydric alcohol (that is, a copolycondensation component of the aliphatic polyether).

The polyamide block copolymer employed in the present invention essentially has the polyether segment (A) having at least one terminal imino group (having an imino group at least at one terminal) (e.g., both terminals (ends)). Therefore, the above various species of polyethers forming a polyether chain need to have an amino group at terminal(s) of a molecule thereof upon using the polyethers as a polyether chain (for producing the polyamide block copolymer). More specifically, the polyamide block copolymer is obtained by a polycondensation (or copolycondensation) of a polyamide component corresponding to at least the polyamide chain (B) (more concretely, a polyamide component having a carboxyl group at terminal (s)) with a polyether having at least one terminal amino group (i.e., a polyether polyamine) corresponding to the polyether segment (A) (or a polyether chain), and if necessary, other components, for example, a polyether free from an amino group. That is, the polyether segment (A) is a segment containing a polyether unit and an imino group constituting at least one amide bond adjacent to the polyether unit (or an imino group adjacent to the carbonyl group). For example, the polyether segment (A) may be (i) a segment containing a polyether unit and two imino groups which are situated (located) at both terminals of the polyether unit and constitute amide bonds, or may be (ii) a segment containing a polyether unit, an imino group which is situated at one terminal of the polyether unit and constitutes an amide bond, and an amino group which is situated at the other terminal of the polyether unit.

Such a polyether having an amino group(s) (a precursor of the polyether segment (A)) may also include a polyether polyamine having at least one terminal amino group (e.g., both terminals, and at least two terminals) of the polyether such as the aliphatic polyether, for example a polyoxyalkylenepolyamine, in addition, an oligomer of such a polyether having an amino group(s) (a polyether-polyamine). Moreover, in the case where the polyether having an amino group(s) has a branched chain (or side chain, or side chain in the polyamide copolymer), the branched chain may have an amino group. That is, the polyether segment (A) may be a polyether segment which has a branched chain having a free amino group.

As the typical polyether-polyamine, there may be exemplified an aliphatic polyether (polyoxyalkylenepolyamine) having an amino group at terminal(s) (or both terminals, two terminals) represented by the following formula (1), an aliphatic polyether (polyoxyalkylenepolyamine) having at least three terminal amino groups (i.e., two terminals (both terminals) of the main chain and terminal(s) of the side chain) represented by the following formula (2), and others.

  (1)

  (2)

In the formula, $R^1$ to $R^4$ are the same or different, and each represent an alkylene group, A represents an alkane skeleton, m, n and p denote an integer of not less than 1, q denotes an integer of not less than 3.

In the above formula (1) or (2), the alkylene groups represented by the groups $R^1$ to $R^4$ are not limited to a specific one, and may be the same or different, for example, may be a $C_{2-4}$alkylene group (e.g., ethylene group, trimethylene group, propylene group, or butane-1,2-diyl group). In particular, a $C_{2-3}$alkylene group (particularly ethylene group or propylene group) is preferred. Incidentally, in the case where m, n, p and q are an integer of not less than 2, each of the alkylene groups $R^1$ to $R^4$ may be the same or different from each other. For example, in the case where m is an integer of not less than 2, the polyoxyalkylene unit may comprise different species of alkyleneoxy groups (e.g., combination of ethyleneoxy group and propyleneoxy group).

Moreover, examples of the alkane skeleton represented by A may include an alkane skeleton corresponding to a polyhydric alcohol being tri- to polyfunctional, for example, an alkane corresponding to the polyhydric alcohol being tri- to polyfunctional (e.g., a $C_{3-8}$alkane such as propane, 2,2-dimethylpropane or 2,2-dimethylbutane) or a (poly)alkoxyalkane corresponding to a condensation product of the polyhydric alcohol being tri- to polyfunctional (e.g., dipropyl ether, and di(2,2-dimethylbutyl)ether), and others.

Each of m and p may sufficiently be an integer of not less than 1 (e.g., about 1 to 200), and may be preferably about 1 to 100, and more preferably about 1 to 80. Moreover, n may sufficiently be an integer of not less than 1 (e.g., about 1 to 20), and may be preferably about 1 to 10, and more preferably about 1 to 6 (particularly, about 1 to 4). Moreover, q may sufficiently be an integer of not less than 3, and may be, depending on the number of functional groups (the number of hydroxyl groups) of a polyhydric alcohol being tri- to polyfunctional (or having not less than three functional (hydroxyl) groups) or a condensation product thereof, for example, about 3 to 10, preferably about 3 to 8, and more preferably about 3 to 6.

Such a polyether having amino groups may include, for example, a polyether available as a series of polyethers called as JEFFAMINE (registered trade mark) supplied from Huntsman Corp., Suntechno Chemical Co. and the like (e.g., JEFFAMINE "XTJ-500", "XTJ-502", "ED-600", "ED-2003", "EDR-148", "XTJ-504", "D-230", "D-400", "D-2000", "XTJ-510", "D-4000", "XTJ-511", "XTJ-512", "T-403", "XTJ-509", "XTJ-542", "T-3000", and "T-5000"), and others, and undoubtedly, the polyether having amino groups is not limited to the above polyethers.

The polyethers having amino groups may be used singly or in combination (in a mixture thereof). In particular, in the case where a main chain of the polyether contains a lot of polyglycol units (e.g., a poly(oxy)alkylene glycol unit) having high water-absorbability, for example, in the case where the main chain contains ethylene glycol units or the like, a polyamide block copolymer containing the above polyglycol units has an extremely high water-absorbability and water-emissivity. Moreover, these polyamide block copolymers often generate a phenomenon, so-called "blooming" under high humidity. However, such a phenomenon does not occur in the case of subjecting a molded material to a thermal history once at a predetermined temperature [for example, not lower than 80° C. (e.g., about 80 to 150° C.)]. This thermal history may be independently carried out. Moreover, in the case where the heat upon producing the composite of the polyamide block copolymer with the polyurethane-series resin satisfies the above temperature condition of the thermal history, in the event, the blooming phenomenon can be inhibited by the process for producing the composite.

Incidentally, in the polyamide copolymer (polyamide copolymer having an imino group), the proportion of the polyether segment (A) may be, in the polyamide block copolymer, about 3 to 95% by weight (e.g., about 10 to 90% by weight), preferably about 5 to 85% by weight (e.g., about 20 to 80% by weight), and more preferably about 8 to 75% by weight (e.g., about 25 to 70% by weight).

As described above, the polyamide block copolymer according to the present invention comprises the polyether segment (A) having an imino group at terminal(s) (or both terminals) as an essential constitutive component. However, the above description undoubtedly does not mean that all of the polyether components (polyether segments) being one of the constitutive components of the polyamide block copolymer are the polyether segment (A) having an imino group(s) (at both terminals). That is, the polyether segment constituting the polyamide block copolymer may singly comprise the polyether segment (A) having an imino group(s) at both terminals, or may comprise the polyether segment (A) having imino groups at both terminals and another polyether segment (e.g., a polyether segment free from imino groups at both terminals). In the concrete embodiment of the latter, part of the polyether segment (soft segment) constituting the polyamide block copolymer may be a polyether segment other than the polyether segment (A) (e.g., a polyether segment (A') free from imino groups at both terminals) in a range (proportion) of, for example, up to 50% by mole (e.g., about 1 to 40% by mole) in the whole polyether segment, preferably up to 30% by mole (e.g., about 3 to 25% by mole), and more preferably up to 20% by mole (e.g., about 5to20% by mole). As a precursor of such polymer segments other than the polyether segment (A), there may be exemplified a polyether segment (A') free from imino groups at both terminals, such as the above illustrated polyether (e.g., an aliphatic polyether), more specifically, a polyether having at least one terminal hydroxyl group (e.g., both terminals).

In the present invention, a polyether segment (A) having an imino group at terminal(s) (both terminals) binds to a polyamide segment (B) by amide bond to form the polyamide block copolymer. That is, the polyamide block copolymer is obtainable by a condensation (dehydration condensation, polycondensation) of a polyamide (or a constitutive component thereof) as the precursor of the polyamide segment (B) and an polyether (polyether polyamine) as the precursor of the polyether segment (A) having an imino group(s) at both terminals, and if necessary, other component(s) (e.g., the above-mentioned polyether having at least one terminal hydroxyl group). The polyamide as the precursor of the polyamide segment (B) includes a polyamide (or a constitutive component thereof, for example, a diamine component and a dicarboxylic acid component, a lactam or aminocarboxylic acid component) having at least one terminal carboxyl group (e.g., at both terminals, at least two terminals), and the polyether as the precursor of the polyether segment (A) includes a polyether (polyether polyamine) having at least one terminal amino groups (e.g., at both terminals). Incidentally, in the case of using the polyether segment (A') free from imino groups at both terminals as a constitutive component of the polyether segment, the polyether segment (A') practically binds with the polyamide segment (B) by an ester bond.

In the case where the polyether segment (A) having imino groups at both terminals or the polyether segment (A') free from an imino group at terminal(s) (both terminals) is connected to a polyamide segment (B), the polyamide as the precursor may have carboxyl groups at both terminals. In such a case, if necessary, an additional dicarboxylic acid(s) may be used. Examples of the suitable dicarboxylic acid may include the above-illustrated dicarboxylic acids, for example, an aliphatic dicarboxylic acid having about 4 to 20 carbon atoms, and preferably about 6 to 12 carbon atoms (e.g., adipic acid, sebacic acid, and dodecanedioic acid).

The molecular weight (or number average molecular weight) of the polyether having an amino group (or one unit of the polyether segment (A)) may be, for example, about 100 to 20000, preferably about 120 to 10000, and more preferably about 130 to 8000, and more preferably about 140 to 6000 (e.g., about 145 to 5000). In particular, the number average molecular weight of the polyether (e.g., the polyether polyamine) having an amino group at terminal(s) (or both terminals), which is a precursor of the polyether segment (A) having an imino group at terminal(s) (or both terminals) for producing the polyamide block copolymer may be, for example, about 100 to 5000 g/mole, preferably about 300 to 3000 g/mole, and more preferably about 500 to 2000 g/mole. The same is applied to the number average molecular weight of the polyether corresponding to the polyether segment (A') free from an imino group at terminal(s) (or both terminals).

Moreover, the number average molecular weight of the polyamide block copolymer (the polyamide block copolymer having an imino group) may be, for example, about 6000 to 100000, preferably about 8000 to 50000, and more preferably about 10000 to 30000.

A variety of polyamide block copolymers are presumable depending on the species of the polyamide segment (B), polyether segment (A) having an imino group at terminal(s) (or both terminals), and polyether segment (A') free from imino groups at both terminals, and according to each of the molecular weight, composition ratio, and further monomer formulation of each of the segments. Such a polyamide block copolymers (polyamide block copolymers having an imino group) may be used singly or in combination.

Incidentally, in the molded composite article of the present invention, the polyamide-series resin may sufficiently comprise at least the polyamide block copolymer (a polyamide block copolymer having an imino group). The polyamide-series resin may comprise such a polyamide block copolymer having an imino group(s) alone, or further comprise a polyamide-series resin (sometimes referred to as additional (another) polyamide-series resin) which is out of the category of the above polyamide block copolymer. For example, the polyamide-series resin in the present invention may be a blend or alloy of the polyamide block copolymer (i.e., the polyamide block copolymer having an imino group) which contains the polyether segment (A) having an imino group(s) at terminal(s) (or both terminals) as the essential constitutive component, and the additional polyamide-series resin. The preferred additional polyamide-series resin includes, for example, a polyamide block copolymer (e.g., a polyamide block copolymer which has no polyether segment (A) having imino groups at both terminals) which is out of the category of the polyamide block copolymer (the polyamide block copolymer having an imino group(s)), an aliphatic polyamide-series resin (e.g., the above-exemplified aliphatic polyamide-series resins), an alicyclic polyamide-series resin (e.g., the above-exemplified alicyclic polyamide-series resins), an aromatic polyamide resin (e.g., the above-exemplified aromatic polyamide-series resins), and others. It is suggested that the proportion of the polyamide block copolymer which has the polyether segment (A) having an imino group(s) at terminal(s) (or both terminals) as the essential component (the proportion of the polyamide block copolymer having an imino group) is, based on the weight ratio, not less than 50% (e.g., 55 to 99%), preferably not less than 60% (e.g., 65 to 95%), and more preferably not less than 70% (e.g., 70 to 90%) relative to the whole blend or alloy.

As the polyamide block copolymer completely free from the polyether segment (A) having an imino group(s) at terminal(s) (or both terminals), there may be mentioned a polyamide-polyether block copolymer, a polyamide-polyester block copolymer, a polyamide-polycarbonate block copolymer, and others.

In these block copolymers, the block component contained in a molecule thereof may include a diol component such as an aliphatic diol [e.g., an aliphatic diol having about 2 to 12 carbon atoms, for example, a straight chain aliphatic diol (e.g., ethylene glycol, propylene glycol, and tetramethylene glycol), and a branched aliphatic diol (e.g., 2-methyl-1,3-propanediol, 3-methyl-1,5-pentanediol, 2-methy-1,8-octanediol, 2,2-diethyl-1,3-propanediol, and 1,9-nonanediol)], an alicyclic diol, or an aromatic diol [e.g., a dihydroxyarene which may have a substituent (e.g., a dihydroxy$C_{6-12}$arene such as dihydroxybenzene, dihydroxytoluene, or dihydroxybiphenyl), and a bisarylalkane which may have a substituent (e.g., a bis(hydroxy$C_{6-10}$aryl) straight or branched $C_{1-4}$alkane such as bisphenol A)], and/or a dicarboxylic acid component such as an aliphatic dicarboxylic acid (e.g., an alkane dicarboxylic acid having about 4 to 20 carbon atoms such as adipic acid, sebacic acid or dodecanedioic acid), an alicyclic dicarboxylic acid (e.g., a cycloalkane dicarboxylic acid having 5 to 10 carbon atoms such as cyclohexane-1,4-dicarboxylic acid or cyclohexane-1,3-dicarboxylic acid), and an aromatic dicarboxylic acid (e.g., terephthalic acid, and isophthalic acid), and others.

For example, the polyamide-ether block copolymer is, a polyamide copolymer having in a molecule thereof a polyether comprising at least one member selected from the above-mentioned diol components as one of the blocks or segments. Moreover, the polyamide-polyester block copolymer is a polyamide copolymer having in a molecule thereof a polyester as one of the blocks or segments, where the polyester is obtained by polycondensation of at least one member selected from the diol components and at least one member selected from the dicarboxylic acid components. The polycarbonate-polyamide block copolymer is a polyamide copolymer having in a molecule thereof a polycarbonate ester of at least one diol selected from the diol components as one of the blocks or segments.

In the polyamide block copolymer, a polyether block, a polyester block and a polycarbonate block which are contained in the copolymer are often used for the purpose of imparting softness or flexibility to the polyamide (as a soft block). A polyamide block copolymer having both such a soft block (or soft segment) and a polyamide block (hard block or hard segment) is referred to as a polyamide elastomer.

The polyamide block copolymer is obtained by copolycondensation of a polyamide block having a reactive terminal group, and any one of a polyether block, a polyester block and a polycarbonate block each having a reactive terminal group, or a combination thereof. For example, a polyether ester amide-series block copolymer (polyether polyamide block copolymer) is obtained by a copolycondensation of a polyamide block having an amino group as the terminal group and a polyoxyalkylene block having a carboxyl group as the terminal group, or is obtained by a copolycondensation of a polyamide block having a carboxyl group as the terminal group and a polyoxyalkylene block having an amino group as the terminal group. Moreover, a polyether ester amide-series block copolymer (polyether polyamide block copolymer) is obtained by a polycondensation of a polyamide block having a carboxyl group as the terminal group and a polyoxyalkylene block having a hydroxyl group as the terminal group. Both of these copolymers are generally known as a polyamide elastomer.

Incidentally, commercially available polyamide elastomers hardly have an amino group in many cases. Throughout this specification, the polyamide block copolymer includes a copolymer obtained by a copolycondensation of the above-described polyamide block and other block(s) (e.g., a polyether block, a polyester block, a polycarbonate block), in addition a polyamide block copolymer obtained by a polyaddition of various diisocyanates to at least one of a polyether block, a polyester block and a polycarbonate block each having carboxyl groups at both terminals, if necessary under coexistence with the dicarboxylic acid component, and a decarboxylation of the resulting product.

Among the polyamide block copolymers, a polyether polyamide block copolymer, in particular a polyamide elastomer containing a polyether segment as a soft segment, is preferred.

In the polyamide-series resin in the present invention, as an additional resin (such as an aliphatic polyamide-series resin, an alicyclic polyamide-series resin or an aromatic polyamide-series resin) suitable for constituting a composition of the polyamide block copolymer comprising (containing) as the essential constitutive component the polyether segment (A) having imino groups at both terminals, there may be exemplified the following resins.

Among the aliphatic polyamide-series resins, the homopolyamide may include a condensation product of an aliphatic diamine component [e.g., a $C_{4-16}$alkylenediamine such as tetramethylenediamine, hexamethylenediamine, or dodecanediamine (preferably a $C_{4-14}$alkylenediamine, and particularly a $C_{6-12}$alkylenediamine)] and an aliphatic dicarboxylic acid component [e.g., an alkylene dicarboxylic acid having about 4 to 20 carbon atoms, such as adipic acid, sebacic acid, or dodecanedioic acid (preferably a $C_{4-16}$alkylenedicarboxylic acid, and particularly a $C_{6-14}$alkylenedicarboxylic acid)], for example, a polyamide 46, a polyamide 66, a polyamide 610, a polyamide 612, and a polyamide 1010;a homopolyamide of a lactam [e.g., a lactam having about 4 to 20 (preferably about 4 to 16) carbon atoms, such as ε-caprolactam or ω-laurolactam] or an aminocarboxylic acid [e.g., an aminocarboxylic acid having about 4 to 20 (preferably about 4 to 16) carbon atoms, such as ω-aminoundecanoic acid], for example, a polyamide 6, a polyamide 11, and a polyamide 12;and others. Moreover, the copolyamide may include a copolyamide which is obtained by copolymerization of a constitutive component capable of constituting a polyamide, e.g., the aliphatic diamine components, the aliphatic dicarboxylic acid components, the lactams and the aminocarboxylic acids. Examples of the copolyamide may include a copolymer of 6-aminocaproic acid and 12-aminododecanoic acid; a copolymer of 6-aminocaproic acid, 12-aminododecanoic acid, hexamethylenediamine and adipic acid; a copolymer of hexamethylenediamine, adipic acid, hydrogenated dimer acid and 12-aminododecanoic acid; a polyamide 6/11, a polyamide 6/12, a polyamide 66/11, a polyamide 66/12;and others.

The alicyclic polyamide-series resin may include a homopolyamide or copolyamide having at least part of one component selected from the group consisting of an alicyclic diamine and an alicyclic dicarboxylic acid as a constitutive component. For example, there may be used an alicyclic polyamide obtained by using an alicyclic diamine and/or an alicyclic dicarboxylic acid as at least one component among a diamine component and a dicarboxylic acid component each constituting a polyamide-series resin. As the diamine component and the dicarboxylic acid component, the above-mentioned aliphatic diamine(s) and/or aliphatic dicarboxylic acid(s) are preferably used in combination with the alicyclic diamine (s) and/or alicyclic dicarboxylic acid(s). Such an alicyclic polyamide-series resin has high transparency, and is known as a so-called transparent polyamide.

Examples of the alicyclic diamine may include a diaminocycloalkane such as diaminocyclohexane (e.g., a diaminoC$_{5-10}$cycloalkane); a bis(aminocycloalkyl)alkane such as bis(4-aminocyclohexyl)methane, bis(4-amino-3-methylcyclohexyl)methane, or 2,2-bis(4'-aminocyclohexyl)propane [e.g., a bis(aminoC$_{5-8}$cycloalkyl)C$_{1-3}$alkane]; a hydrogenated xylylenediamine and others. Moreover, the alicyclic dicarboxylic acid may include a cycloalkanedicarboxylic acid such as cyclohexane-1,4-dicarboxylic acid or cyclohexane-1,3-dicarboxylic acid (for example, a C$_{5-10}$cycloalkanedicarboxylic acid), and others.

Among the alicyclic polyamide-series resins, for example, a condensation product (a homo- or copolyamide) of the aliphatic dicarboxylic acid and the alicyclic diamine is preferred.

The aromatic polyamide-series resin may include a polyamide in which at least one component of the aliphatic diamine component and the aliphatic dicarboxylic acid component in the above aliphatic polyamide comprises an aromatic component, for example, a polyamide having an aromatic component in a diamine component [for example, a condensation product of an aromatic diamine (e.g., metaxylylenediamine) and an aliphatic dicarboxylic acid, such as MXD-6], a polyamide having an aromatic component in a dicarboxylic acid component [e.g., a condensation product of an aliphatic diamine (e.g., trimethylhexamethylenediamine) and an aromatic dicarboxylic acid (e.g., terephthalic acid, isophthalic acid)], and others.

The above-mentioned blendable polyamide-series resin may further include a polyamide comprising a dimer acid as a dicarboxylic acid component, a polyamide in which a branched chain structure is introduced by using a small amount of a polyfunctional polyamine and/or polycarboxylic acid component, a modified polyamide (e.g., a N-alkoxymethylpolyamide), and a composition thereof, and others.

In the molded composite article of the present invention, the number average molecular weight of the polyamide-series resin (e.g., the present invention-related polyamide block copolymer having in a molecule thereof the polyether segment (A) having imino groups at both terminals as the essential constitutive component, and a blend or alloy of the polyamide block copolymer with the above-mentioned extensive polyamide-series resin) is about 6,000 to 100,000, preferably about 8,000 to 50,000, and more preferably about 10,000 to 30,000.

In the present invention, in the case where the polyamide-series resin constituting the resin member (Ia) comprises a polyamide block copolymer having in a molecule thereof the polyether segment (A) having imino groups at both terminals as the essential constitutive component, or a composition containing the polyamide block copolymer as the main component, significantly high bonded strength is achieved in the composite article of the present invention which comprises the resin member (Ia) and the resin member (IIa) comprising a thermoplastic polyurethane-series resin, in comparison with case where the polyamide-series resin comprises a polyamide block copolymer free from (excluding) the polyether segment (A) having imino groups at both terminals as the constitutive component. In particular, in the case where the polyether segment (A) having imino groups at both terminals comprises as the base component a condensation product (condensate) of an aliphatic diol having 2 to 8 carbon atoms, more preferably an aliphatic diol having 2 to 4 carbon atoms, and more preferably an aliphatic diol having 2 to 3 carbon atoms, higher bonded strength between the resin members (Ia) and (IIa) is realized.

In the molded composite article of the present invention, the polyamide-series resin may be a polyamide-series resin having an amino group. As described above, in the present invention, the resin member (Ia) comprising a polyamide-series resin is directly bonded to the resin member (IIa) comprising a thermoplastic polyurethane-series resin to form a molded composite article. In this regard, the polyamide-series resin basically comprises a polyamide block copolymer having in a polymer molecule thereof a polyether segment (A) having imino groups at both terminals as the essential constitutive component. In addition, the specific concentration of the free amino group in the polyamide-series resin realizes further improvement in bonded strength of the composite article comprising the resin member (Ia) and the resin member (IIa).

The amino group usually shows a free amino group (—NH$_2$ group) and usually does not include a —NH— (imino) group and —N< group derived from an amide bond constituting the main chain of the polyamide-series resin, a urea bond, a urethane bond and other bonds. The free amino group may exist at terminal(s) or branched chain of the polyamide block copolymer molecule in the present invention, or may exist at terminal(s) or branched chain of additional (another) polyamide resin for compounding with the polyamide block copolymer in the present invention to form a blend or alloy. Further, in addition to the above, the polyamide-series resin constituting the resin member (Ia) may comprise a compound having a free amino group to be mixed therewith.

The content (or concentration) of the amino group (or amino group concentration) in the polyamide-series resin constituting the resin member (Ia) is, relative to 1 kg of the polyamide-series resin, not less than 10 mmol (e.g., about 10 to 300 mmol), preferably not less than 15 mmol (e.g., about 15 to 200 mmol), more preferably not less than 20 mmol (e.g., about 20 to 150 mmol), and particularly not less than 30 mmol (e.g., about 30 to 100 mmol). The polyamide-series resin preferably contains a terminal amino group at a range of such a content.

The content of the amino group may be adjusted by a conventional method, for example, (a) a method of adjusting a proportion of a diamine component constituting a polyamide-series resin; (b) a method of forming a blend or alloy by combining a plurality of polyamide-series resins different in amino group concentration from each other (e.g., by using a polyamide-series resin having an amino group at a low concentration in combination with a polyamide-series resin having an amino group at a high concentration). Moreover, the content of the amino group may be adjusted by making the polyamide-series resin having an amino group into a polyamide-series resin composition which contains a polyamide block copolymer containing the polyether segment (A) (hereinafter, sometimes simply referred to as a polyamide-series resin). In such a polyamide-series resin composition, for example, the content of the amino group may be adjusted by (c) a method of involving (C) a compound having a free amino group (or amine compound, e.g., an amine compound having an amino group at a high concentration and having a relatively low molecular weight) in the polyamide-series resin (e.g., a polyamide having a terminal amino group at a low concentration); or others. More specifically, for example, in a copolycondensation of a block having amino groups at the both terminals with a block having carboxyl groups at both terminals, introduction of an amino group into the polyamide block copolymer may be conducted by increasing the proportion of the block having amino groups at both terminals, or by adding an amine compound (e.g., the above mentioned aliphatic diamine, alicyclic diamine, and aromatic diamine; a monoamine; a polyamide oligomer; and a polyamide-series resin) in an adequate amount.

In the case where the polyamide-series resin comprises a polyamide resin alone, the amino group concentration may be adjusted by a method such as the above-mentioned method (a). Moreover, in the case where the polyamide-series resin is a mixture which contains a plurality of polyamide-series resins and is prepared by the above-mentioned method (b), the amino group concentration of each polyamide-series resin may be suitably adjusted by the method (a) and/or (c) as described above.

When the polyamide-series resin is a polyamide resin alone (e.g., a resin prepared by the method (a)), or a mixture containing a plurality of polyamide-series resins different in amino group concentration from each other (e.g., a mixture prepared by the method (b)), the amino group concentration of the polyamide-series resin is, for example, not less than 20 mmol/kg (e.g., about 20 to 300 mmol/kg), preferably not less than 40 mmol/kg (e.g., about 40 to 200 mmol/kg), more preferably not less than 60 mmol/kg (e.g., about 60 to 150 mmol/kg), and particularly not less than 70 mmol/kg (e.g., about 70 to 100 mmol/kg).

In the case using combination of a plurality of polyamide-series resins different in amino group concentration from each other, the total content of the amino group in the polyamide-series resins may, for example, be adjusted by using a polyamide-series resin having an amino group concentration of about 0 to 30 mmol/kg (e.g., about 0 to 20mmol/kg) in combination with a polyamide-series resin having an amino group concentration of about 40 to 400 mmol/kg (preferably about 50 to 300 mmol/kg, and particularly about 100 to 200 mmol/kg). The proportion of the polyamide-series resin having an amino group at a higher concentration may for example be about 1 to 60 parts by weight, preferably about 5 to 50 parts by weight, and more preferably about 10 to 40 parts by weight relative to 100 parts by weight of the polyamide-series resin having an amino group at a lower concentration.

Moreover, in the case where the polyamide-series resin is a resin composition comprising the polyamide resin and an amine compound (e.g., a composition prepared by the method (c)), the amino group concentration of the polyamide-series resin may for example be not less than 10 mmol/kg (e.g., about 10 to 300 mmol/kg), preferably not less than 20 mmol/kg (e.g., about 20 to 200 mmol/kg), more preferably not less than 40 mmol/kg (e.g., about 40 to 150 mmol/kg), and particularly not less than 50 mmol/kg (e.g., about 50 to 100 mmol/kg).

As the amine compound (the compound (C) having a free amino group), there may be used an amine compound having a relatively low molecular weight, such as a monoamine, a polyamine [e.g., a diamine (for example, the above-mentioned aliphatic diamines, alicyclic diamines and aromatic diamines), in addition, a polyamine such as an aliphatic polyamine (e.g., diethylenetriamine)], and a polyamide oligomer; a polyamide-series resin (the above exemplified polyamide-series resin having a free amino group); and others. The amine compounds may be used singly or in combination. Among these compounds, the polyamide oligomer is particularly preferred.

As the polyamide oligomer, there may be used a polyamide having a relatively low molecular weight, which is obtained by a conventional manner, for example, by adjusting polycondensation or other conditions and using the above-mentioned polyamide component(s). For example, as the polyamide component to be a raw material, there may be used a combination of the above-mentioned diamine [e.g., an aliphatic diamine (e.g., an alkylenediamine), an alicyclic diamine, an aromatic diamine] and a dicarboxylic acid (e.g., an aliphatic dicarboxylic acid, an aromatic dicarboxylic acid), a combination of the above-mentioned diamine and/or dicarboxylic acid and a lactam (e.g., a lactam having about 4 to 20 carbon atoms, such as ω-laurolactam), and other combinations. The polyamide oligomer may be obtained by for example polymerizing the lactam and the aliphatic diamine with heating and stirring under an applied pressure.

The number average molecular weight of the polyamide oligomer is, for example, about 500 to 10,000, preferably about 500 to 8,000 (e.g., about 1,000 to 7,000), more preferably about 1,000 to 5,000, and usually about 2,000 to 6,000 (e.g., about 3,000 to 6,000).

The polyamide oligomer may have an amino group at least at one terminal of the main chain, for example, may have amino groups at both terminals of the main chain. Moreover, the polyamide oligomer may have an amino group at a branched chain thereof.

The amine compound (particularly a polyamide oligomer) is preferably used in combination with a resin such as the aliphatic polyamide-series resin, the alicyclic polyamide-series resin or the polyamide block copolymer, as the base polyamide resin.

In the case where the polyamide-series resin comprises an amine compound in combination, the total content of the amino group in the polyamide-series resin (or composition) may be adjusted, for example, by using a polyamide-series resin having an amino group concentration of about 0 to 30 mmol/kg (preferably about 0 to 20 mmol/kg) in combination with an amine compound having an amino group concentration of about 40 to 1000 mmol/kg (preferably about 50 to 700 mmol/kg, and particularly about 100 to 500 mmol/kg).

The proportion of the amine compound may be controlled so that the content of the amino group in the polyamide-series resin is included within the above-described range. For example, the proportion of the amine compound (e.g., the polyamide oligomer) is, for example, not more than 10 parts by weight (about 0.01 to 10 parts by weight), preferably about 0.1 to 8 parts by weight, and particularly not more than 7 parts by weight (about 0.5 to 7 parts by weight) relative to 100 parts by weight of the base polyamide resin (a polyamide-series resin having an amino group at a low concentration). Too large proportion of the amine compound has a possibility of deteriorating resin properties, in particular in the case of using the polyamide-series resin as a hard resin.

Moreover, the proportion of the amine compound (a compound having a free amino group (C)) may be, in the polyamide-series resin composition, about 0.01 to 20% by weight, preferably about 0.1 to 15% by weight, and more preferably about 0.5 to 10% by weight (e.g., about 1 to 8% by weight).

In order to further enhance the bonded strength between the polyamide-series resin member (e.g., a hard resin member) and the thermoplastic polyurethane-series resin member (e.g., a soft resin member), the enthalpies of fusion and crystallization of the polyamide-series resin may be not more than 100 J/g (e.g., about 0 to 100 J/g), preferably not more than 80 J/g (e.g., about 0 to 80 J/g), and more preferably not more than 70 J/g (e.g., about 0 to 70 J/g). According to the present invention, even using a polyamide-series resin having a low degree of crystallinity, certain and efficient bonding (or joining) can be achieved. The enthalpies of fusion and crystallization in such a polyamide-series resin may for example be selected from a range of not more than 30 J/g (e.g., about 0 to 30 J/g), preferably not more than 20 J/g (e.g., about 0 to 20 J/g), and more preferably not more than 17 J/g (about 0 to 17 J/g).

Incidentally, the "enthalpies of fusion and crystallization" of the polyamide-series resin denotes a value obtained by subtracting a heat of crystallization ($\Delta$Hf) generated along with crystallization of a resin from a heat of fusion ($\Delta$Hm) necessary to melt the resin. That is, in a measurement of the heat of fusion, if both the heat of crystallization and the following heat of fusion are observed along with raising the temperature, the enthalpies of fusion and crystallization of the polyamide-series resin is assessed as a value subtracted the found value $\Delta$Hf of the heat of crystallization per one gram of the resin from the found value $\Delta$Hm of the heat of fusion per one gram of the resin. The enthalpies of fusion and crystallization can be measured by a differential scanning calorimeter (DSC apparatus) based on JIS (Japanese Industrial Standards) K 7122. Incidentally, since the heat of crystallization cannot be observed in a fully amorphous polyamide, the enthalpies of fusion and crystallization of such a polyamide is qualified as 0 J/g.

The polyamide-series resin having such enthalpies of fusion and crystallization, in particular a polyamide-series resin having enthalpies of fusion and crystallization of not more than 20 J/g (e.g., a transparent polyamide) may be molded by a known molding method. The further details about of such a polyamide-series resin may for example be referred to Japanese Patent Application Laid-Open No. 239469/1996 (JP-8-239469A), Japanese Patent Application Laid-Open No. 1544/2000 (JP-2000-1544A), and others.

Incidentally, the concentration of the carboxyl group (or carboxyl group concentration) in the polyamide-series resin is not particularly limited to a specific one, and may for example be about 0.1 to 200 mmol/kg, preferably about 0.5 to 150 mmol/kg, and more preferably about 1 to 100 mmol/kg.

In such a range that the effects of the present invention are not deteriorated, the polyamide-series resin member may comprise other resin(s) [for example, a thermoplastic resin such as a polyester-series resin, a polycarbonate-series resin, a polysulfone-series resin, a polyimide-series resin, a polyketone-series resin, a polyolefinic resin, a styrenic resin, a (meth)acrylic resin, or a halogen-containing vinyl-series resin)], various additives [for example, a filler or reinforcing agent (e.g., a reinforcing fiber), a stabilizer (e.g., an ultraviolet ray absorbing agent, an antioxidant, and a heat stabilizer), a coloring agent, a plasticizer, a lubricant, a flame retardant, and an antistatic agent].

Incidentally, in accordance with the production of the molded composite article of the present invention, a "warp" sometimes occurs in the product depending on the difference between mold shrinkage factors of the resin members. In the case where the degree of the correction for the warp is large, the bonding part of resin members may be broken, or the generation of stress crack in each resin member occurs. Therefore, the polyamide-series resin preferably has lower crystallinity. The final crystallinity degree (mean final crystallinity degree) of the polyamide-series resin is advantageously not more than 50% (e.g., about 5 to 50%), preferably not more than 40% (e.g., about 5 to 40%), and more preferably not more than 30% (e.g., about 10 to 30%). In the case where a polyamide homopolymer is taken as an example and the final crystallinity degree is compared, the final crystallinity degree becomes smaller in the following order.

polyamide 66>polyamide 6≧polyamide 612>polyamide 11≦polyamide 12

Incidentally, considering only the final crystallinity degree, the copolymer is more advantageous than the homopolymer. Further, in general the copolymer is also more advantageous than the homopolymer from the perspective that the copolymer is superior to the homopolymer in flexibility.

In the case of the polyamide block copolymer (a polyamide elastomer) which comprises a polyamide homopolymer as the hard segment and a polyether as the soft segment, the final crystallinity degree can be adjusted by the ratio of the hard segment and the soft segment. In the case where the final crystallinity degree of the polyamide block copolymer is adjusted to not more than 40% (e.g., about 5 to 40%), preferably not more than 35% (e.g., about 5 to 35%) and more preferably not more than 30% (e.g., about 10 to 30%), such a polyamide block copolymer can provide a flexibility which resembles to that of the thermoplastic polyurethane-series resin.

Incidentally, the term "the final crystallinity degree" means a degree of crystallinity measured by an X-ray diffraction analysis using a flat plate 1 mm thick, where the flat plate is formed by heating a sample resin to a temperature which is 20° C. higher than a melting point thereof, and then cooling the resin to a room temperature at a rate of 3° C./minute by means of a precision (or accurate) heat pressing machine. The melting point of the resin is measured by a differential scanning calorimeter (DSC apparatus) in accordance with JIS K 7122.

(Polyurethane-series Resin)

The thermoplastic polyurethane-series resin may be obtained by reacting a diisocyanate, a diol and, if necessary, a chain-extension agent.

Example of the diisocyanate may include an aliphatic diisocyanate such as hexamethylene diisocyanate (HMDI), or 2,2,4-trimethylhexamethylene diisocyanate; an alicyclic diisocyanate such as 1,4-cyclohexane diisocyanate, dicycloalkylmethane-4,4'-diisocyanate, or isophorone diisocyanate (IPDI); an aromatic diisocyanate such as phenylene diisocyanate, tolylene diisocyanate (TDI), or diphenylmethane-4, 4'-diisocyanate (MDI); an araliphatic diisocyanate such as xylylene diisocyanate; and others. As the diisocyanate, there may also be used a compound having an alkyl group (e.g., methyl group) substituted on a main chain or ring thereof. The diisocyanate(s) may be used singly or in combination.

Examples of the diol may include a polyester diol [for example, a polyester diol (aliphatic polyester diol) derived from an aliphatic dicarboxylic acid component (e.g., a $C_{4-12}$aliphatic dicarboxylic acid such as adipic acid), an aliphatic diol component (e.g., a $C_{2-12}$aliphatic diol such as ethylene glycol, propylene glycol, butanediol, or neopentyl glycol), and/or a lactone component (e.g., a $C_{4-12}$lactone such as ε-caprolactone); for example, a poly(ethylene adipate), a poly(1,4-butylene adipate), and a poly(1,6-hexylene adipate), a poly-ε-caprolactone], a polyether diol [for example, an aliphatic polyether diol, e.g., a poly(oxy$C_{2-4}$alkylene)glycol such as a poly(oxyethylene)glycol, a poly(oxytrimethylene) glycol, a poly(oxypropylene)glycol or a poly(oxytetramethylene)glycol, and a block copolymer of the poly(oxyalkylene)glycol (e.g., a polyoxyethylene-polyoxypropylene block copolymer); an aromatic polyether diol, e.g., an adduct of an aromatic diol with an alkylene oxide, such as a bisphenol A-alkylene oxide adduct (e.g., an adduct of a $C_{2-4}$alkylene oxide such as ethylene oxide, or propylene oxide)]; a polyester ether diol (a polyester diol obtained by using the polyether diol as part of a diol component); and others. The diol(s) may be used singly or in combination. Among these diols, the polyester diol or the polyether diol is used in many cases, and among the polyether diols, a polytetramethylene ether glycol practically used.

As the chain-extension agent, there may be used a glycol [for example, a short chain glycol, e.g., a $C_{2-10}$alkanediol such as ethylene glycol, propylene glycol, 1,4-butanediol, or 1,6-hexanediol; and a bishydroxyethoxybenzene (BHEB)], and in addition a diamine [for example, an aliphatic diamine such as a $C_{2-10}$alkylenediamine, e.g., ethylenediamine, trimethylenediamine, tetramethylenediamine, or hexamethylenediamine; an alicyclic diamine such as isophorone diamine; an aromatic diamine such as phenylenediamine or xylylenediamine]. The chain-extension agent(s) may be used singly or in combination.

The thermoplastic polyurethane-series resin also may include a perfect thermoplastic polyurethane obtained by using a diol and a diisocyanate at a substantially equivalent amount, and an imperfect thermoplastic polyisocyanate having a small amount of a residual free (or unreacted) isocyanate, which is obtained by using a slightly excess amount of a diisocyanate relative to a diol Among the thermoplastic polyurethane-series resins, in particular, the thermoplastic polyurethane elastomer is preferred, which is obtained by using a diol [e.g., a diol having a polyester unit or a polyether unit], a diisocyanate, and a glycol (e.g., a short chain glycol) as the chain-extension agent. The thermoplastic polyurethane elastomer comprises a hard segment (hard block) which comprises a polyurethane comprising a glycol and a diisocyanate, and a soft segment (soft block) which comprises an aliphatic polyether diol (e.g., a poly(oxyethylene) glycol), an aliphatic polyester diol and others. The polyurethane elastomer may include, for example, a polyether urethane elastomer, a polyester ether urethane elastomer, a polycarbonate urethane elastomer, and others, depending on the species of the soft segment.

These thermoplastic polyurethane-series resins may be used singly or in combination.

In such a range that the effects of the present invention are not deteriorated, the thermoplastic polyurethane-series resin member may comprise other resin(s) (e.g., a thermoplastic resin, particularly a thermoplastic elastomer such as a polyamide-series elastomer, a polyester-series elastomer, or a polyolefinic elastomer), a stabilizer (e.g., a heat stabilizer, an ultraviolet ray absorbing agent and an antioxidant), a plasticizer, a lubricant, a filler, a coloring agent, a flame retardant, an antistatic agent, and others.

In such a molded composite article of the present invention, the polyamide-series resin and the thermoplastic polyurethane-series resin are firmly bonded together without an adhesive. The bonded strength is usually not less than 30 N/cm, and cohesive failure sometimes occurs along with separation of the polyamide-series resin member (e.g., a hard resin member) from the thermoplastic polyurethane-series resin member (e.g., a soft resin member). The bonded strength of such a molded composite article is usually 30 N/cm to cohesive failure, preferably not less than 40 N/cm, and particularly not less than 50 N/cm (50 N/cm to cohesive failure).

[Production Process of Molded Composite Article]

The molded composite article of the present invention may be produced by bonding the polyamide-series resin or (Ia) a resin member thereof to the thermoplastic polyurethane-series resin or (IIa) a resin member thereof under heating. In usual, the molded composite article may be practically produced by heating at least one selected from the group consisting of (i) the polyamide-series resin or the resin member thereof (Ia) and (ii) the thermoplastic polyurethane-series resin or the resin member thereof (IIa) to bond the former (i) to the latter (ii). In the preferred embodiment, the molded composite article may be produced by heating at least one selected from the group consisting of (i) the polyamide-series resin or the resin member thereof (Ia) and (ii) the thermoplastic polyurethane-series resin or the resin member thereof (IIa) to be molten with bringing former (i) into contact with the latter (ii) to bond both resins (or resin members) together. Such a molded composite article may for example be produced by bonding (e.g., thermal-welding) the hard resin (e.g., the polyamide-series resin) to the soft resin (e.g., the thermoplastic polyurethane-series resin) in a molding process by means of a conventional method such as a thermoforming (e.g., a heat press molding, an injection press molding), a vacuum molding, an injection molding (e.g., an insert injection molding, a two-color (or double) injection molding, a core-back injection molding, a sandwich injection molding), an extrusion molding (e.g., a co-extrusion molding, a T-die lamination molding), or a blow molding.

For example, the molding method such as an insert molding or an injection press molding may comprise heating the thermoplastic polyurethane resin to be molten with bringing the thermoplastic polyurethane resin in the molten state into contact with at least part of a resin member comprising the polyamide-series resin to bond the thermoplastic polyurethane resin to the polyamide-series resin member, or heating the polyamide-series resin to be molten with bringing the polyamide-series resin in the molten state into contact with at least part of a resin member comprising the thermoplastic polyurethane-series resin to bond the polyamide-series resin to the thermoplastic polyurethane resin member. Moreover, the molding method such as a double injection molding or a co-extrusion molding may comprise heating both of the polyamide-series resin and the thermoplastic polyurethane-series resin to be molten with bringing the polyamide-series resin in the molten state into contact with the thermoplastic polyurethane-series resin in the molten state to bond both resins together. A molded composite article in which the polyamide-series resin member and the polyurethane-series resin member are firmly bonded together can be obtained by heating at least one resin selected from the polyamide-series resin and the polyurethane-series resin to be molten with bringing the polyamide-series resin into contact with the thermoplastic polyurethane-series resin, bonding both resins together, and usually cooling the resulting (bonded) matter. Moreover, depending on a purpose and an application, it is sufficient to bond the polyamide-series resin member to the thermoplastic polyurethane-series resin member at least in part.

Incidentally, the resin can be molten by heating the resin to a temperature of not lower than a melting point thereof. In the case of a substantially uncrystallized resin, the resin can be molten by heating the resin to a temperature of not lower than a glass transition point (Tg) thereof.

According to the present invention, since the specific polyamide-series resin is employed, the bonded strength can be significantly improved even in a molded composite article obtained from a different kind of materials. Accordingly, the present invention ensures such a high-level bonded strength that cannot be obtained from a physical action due to simple thermal welding. Therefore, throughout of this specification, "thermal welding" includes not only simple thermal welding, but also thermal welding (thermal bonding) including a chemical reaction.

As described above, it is not particularly limited which of the polyamide-series resin or the polyurethane-series resin is molten. The method (or process) may comprise heating a soft resin having a lower melting point or glass transition point (Tg), and bonding the soft resin to a hard resin member comprising a hard resin having a higher melting point or Tg; or comprise heating a hard resin having a higher melting point or Tg, and bonding the hard resin to a soft resin member comprising a soft resin having a lower melting point or Tg. Among these methods, in particular, the former method has an advantage over conventional techniques since the effects of the present invention are characteristically and effectively exhibited. On the contrary, the conventional method with the use of simple physical thermal welding comprises melting (fusing) the surface of the precedently molded member (mainly a polyamide-series resin member) by heat (heat from the resin in a molten state) of the subsequently molded resin (mainly a polyurethane-series resin) and bonding both resins together. In such a case, the molding temperature of the polyurethane-series resin frequently becomes lower than the melting point of the precedently molded polyamide-series resin. Moreover, even when the molding temperature of the polyurethane-series resin is higher than the melting point of the polyamide-series resin, the heat quantity is often insufficient to melt the surface of the polyamide-series resin member. Therefore, the conventional techniques usually never comprise such a case that the polyamide-series resin member is molded prior to molding the polyurethane-series resin. However, even in the above case, according to the present invention, since the polyamide-series resin and the thermoplastic polyurethane-series resin can be more easily bonded together, the present invention can increase the freedom of the production process of the molded composite article and can also rationalize (labor- or power-save) the process step to a large degree.

In the present invention, in many cases, the hard resin usually comprises the polyamide-series resin and the soft resin usually comprises the thermoplastic polyurethane-series resin. Moreover, it is also feasible that the hard resin may comprise the thermoplastic polyurethane-series resin and the soft resin may comprise the polyamide-series resin. Moreover, the hardness of the polyamide-series resin may be in the same level as that of the thermoplastic polyurethane-series resin.

To be more precise, in the heat press molding, the molded composite article may be produced by melting at least one resin selected from the group consisting of the hard resin (or composition) and the soft resin (or composition) in a metal mold of the press molding, bringing one resin (or composition) into contact with the other resin (or composition) under an applied pressure, and bonding both resins (or compositions) together. In the heat press molding, the hard resin and/or the soft resin may be filled into the metal mold in a pellet form, a powdered form or other form(s), or may be loaded to the metal mold as a molded article precedently formed by other molding method.

In the insert injection molding, the molded composite article may be produced by molding any one of the hard resin (or resin composition) or the soft resin (or resin composition), usually the hard resin, with the use of a molding method (such as an injection molding, an extrusion molding, a sheet molding or a film molding), inserting or putting thus shaped molded article in a metal mold, and then injecting the other resin, usually the soft resin, to the space or cavity between the molded article and the metal mold. In the insert injection molding, the molded article to be inserted in the metal mold is preferably pre-heated as high as possible.

In the two-color (or double) injection molding, a molded composite article may be produced by injecting any one component of the hard resin (or resin composition) or the soft resin (or resin composition), usually the hard resin, to a metal mold by means of two injection molding machines or more, and exchanging cavity of the metal mold by rotation or movement of the metal mold, and injecting the other component, usually the soft resin, to the space or cavity between thus obtained molded article and the metal mold.

In the core-back injection molding, a molded composite article may be produced by injecting any one component of the hard resin (or resin composition) or the soft resin (or resin composition), usually the hard resin, in a metal mold, enlarging the cavity of the metal mold, and injecting the other component, usually the soft resin, to the space or cavity between thus obtained molded article and the metal mold.

Among these molding methods, particularly from the viewpoint of mass production or other properties, suitable methods includes, for example, the heat press molding such as injection press moldings, and the injection molding (e.g., insert injection moldings, double injection moldings, core-back injection moldings and sandwich injection moldings).

In the thermal welding, the melting temperature (or thermal welding temperature) of the hard resin and/or soft resin may be selected depending on the species of the both resins (or resin compositions), and may for example be selected within a range of about 100 to 250° C., preferably about 120 to 230° C., and more preferably about 150 to 220° C.

The structure and shape of the molded composite article is not particularly limited to a specific one, and may be a structure suitable for design, decorative property, touch or others. For example, such a structure may be obtained by coating or laminating part or all of the soft resin member with the hard resin member, and usually, preferably obtained by coating or laminating part or all of the hard resin member with the soft resin member (for example, obtained by coating contact part of the hard resin member with human body (such as a hand), with the soft resin member). Moreover, the concrete structure may include, for example, a two-dimensional structure (such as a sheet-like form or a plate-like form), and a three-dimensional structure (such as a stick-like form, a tube-like form, a casing or a housing).

According to the present invention, the hard resin and the soft resin can be directly and firmly bonded together by thermal welding without (going through) complicated production steps (e.g., a step for creating a concavo-convex site in the composite area, a step for applying or coating with an adhesive). Therefore, the present invention ensures to conveniently obtain a molded composite article improved in properties such as design, decorative property, or good touch or texture (e.g., soft texture, flexibility).

INDUSTRIAL APPLICABILITY

The molded composite article of the present invention may be used as various industrial components (or parts), for example, an automotive part (e.g., an automotive interior part such as an instrument panel, a center panel, a center console box, a door trim, a pillar, an assist grip, a steering wheel or an air bag cover; an automotive exterior part such as a lacing or a bumper; an automotive functional component such as a rack and pinion boot, a suspension boot or a constant velocity joint boot), a household electrical part (e.g., a cleaner bumper, a switch of a remote control, and a key top of office automation (OA) apparatus), a product to be used in water (e.g., swimming goggles, and a cover of a underwater camera), an industrial part (e.g., a cover part; various industrial parts equipped with a packing for the purpose of sealing property, water proofing property, sound insulating property, vibration insulating property, or other properties; an industrial rubber roller), an electric or electronic device part (e.g., a curl cord wire covering, a belt, a hose, a tube and a sound deadening gear), sports goods, shoe goods (e.g., athletic shoes, and a shoe sole), and a part requiring design or decorative property (e.g., dark glasses, and glasses).

Among them, the molded composite article is particularly suitable for a constitutive member of the shoe or the roll (e.g., a rubber roller). The constitutive member of the shoe includes a shoe part such as a shoe sole (sole), and others. Moreover, the molded composite article may form (or constitute) athletic shoes, work shoes (e.g., boots, rain shoes, shoes for gardening). In the shoe application, a combination of a hard or glass fiber-reinforced polyamide-series resin and a soft polyurethane-series resin becomes easy, although such a combination was troublesome in the past. Accordingly, the molded composite article greatly contributes to improvement in design or functionality of the shoe.

Further, in the roll (e.g., a rubber roller) application, for example, the roll may comprise an axis (shaft) in which at least the surface layer comprises a polyamide-series resin, and a thermoplastic polyurethane-series resin layer formed along the surrounding surface of the axis. The axis may be obtained by forming a polyamide-series resin layer on the surface of the metal shaft, or may be an axis comprising a polyamide-series resin. In such a roller application, since a cutting finish for obtaining a shaft precision and a surface finish of a thermoplastic polyurethane-series resin can be conducted in one operation by the same grinding machine, the production process of the roller can be significantly abbreviated and the cost can be dramatically reduced.

EXAMPLES

The following examples are intended to describe this invention in further detail and should by no means be interpreted as defining the scope of the invention. Incidentally, the attributes (characteristic values) were measured in the following manner.

(1) Concentration of the terminal amino group ([$NH_2$]): A polymer (about 1 g) was dissolved in 40 mL of a mixed solvent of phenol/methanol (ratio by volume: 9/1). To thus obtained sample solution was added Thymol Blue (thymolsulfonphthalein) as an indicator, and the sample solution was titrated with a 1/20 N (0.05 N) hydrochloric acid.

(2) The melting point ($T_m$) was measured under an atmosphere of nitrogen with "DSC220C" manufactured by Seiko Instruments Inc, with heating a polyamide-series resin to 250° C. from a room temperature at a heating rate of 10° C./min (called as "first heating run") and maintaining the temperature at 250° C. for 10 minutes, subsequently cooling the resin from 250° C. to −80° C. at a cooling rate of 10° C./min (called as "first cooling run"), and then heating the resin from −80° C. to 250° C. at a heating rate of 10° C./min (called as "second heating run"). The endothermic peak temperature in the second heating run was regarded as the melting temperature ($T_m$) of the polyamide-series resin.

(3) Bonded strength: From each of the polyurethane elastomer and the polyamide-series material, films having a field of 10×10 cm and a thickness of 0.5 mm were prepared by a heat press molding. Subsequently, these films were pressed for 10 minutes under a pressure of 400 kgf/cm² at a predetermined temperature (three kinds of temperature, i.e., $T_m+10°$ C., $T_m°$ C., $T_m-10°$ C.) shown in Table 1. In the pressing, an aluminium foil was interposed between the polyurethane elastomer (TPU) film and the polyamide-series material film by 3 cm from the edge so as to provide a place for setting a tensile fixture (joint) to be used in the subsequent peel test.

Thus obtained composite film was cut into a strip specimen having a size of 2 cm in width, and then the strip specimen was subject to the peel test (tensile test). Thus determined strength was regarded as the bonded strength of the composite film. The tensile test was conducted with "RTA-1T" manufactured by ORIENTEC Co., LTD. at a tensile speed of 50 mm/min. The bonded strength was calculated by the following formula:

Bonded strength [unit: N/cm]=(Actually measured strength) [unit: N]/2 [unit: cm].

Incidentally, the following polyurethane elastomers were used as the polyurethane elastomer (TPU).

[TPU-01] "C90A10" manufactured by BASF: a polyurethane elastomer having an ester-series soft segment
[TPU-02] "ET885-10" manufactured by BASF: a polyurethane elastomer having an ether-series soft segment.

Example 1

Into a pressure vessel (70 L) equipped with an agitator, a thermometer, a torque meter, a manometer, an nitrogen gas inlet, a pressure regulator and a polymer dispenser, were charged 12-aminododecanoic acid (15 kg), a polyethylene glycol (0.8 kg) having amino groups at both terminals (Trade name "XTJ-504" manufactured by Suntechno Chemical Co.), and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of [$NH_2$]=31 mmol/kg, and the melting point of $T_m$=168° C.

Example 2

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polyglycol (4.363 kg) having amino groups at both terminals (Trade name "XTJ-542" manufactured by Suntechno Chemical Co.), and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of [$NH_2$]=37 mmol/kg, and the melting point of Tm =165° C.

Example 3

Into a pressure vessel (70 L) equipped with an agitator, a thermometer, a torque meter, a manometer, an nitrogen gas inlet, a pressure regulator, and a polymer dispenser, were charged 12-aminododecanoic acid (11.2 kg), a polyethylene glycol (1.15 kg) having amino groups at both terminals (Trade name "XTJ-504" manufactured by Suntechno Chemical Co.), and adipic acid (1.12 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 11 kg). Thus obtained polymer had the terminal amino group concentration of [$NH_2$]=23 mmol/kg, and the melting point of Tm =168° C.

Example 4

Into a pressure vessel (70 L) equipped with an agitator, a thermometer, a torque meter, a manometer, an nitrogen gas inlet, a pressure regulator, and a polymer dispenser, were charged 12-aminododecanoic acid (17 kg), a polyglycol (2.6 kg) having amino groups at both terminals (Trade name "XTJ-542" manufactured by Suntechno Chemical Co.), and adipic acid (0.38 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of [$NH_2$]=33.5 mmol/kg, and the melting point of Tm =174° C.

Example 5

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polyglycol (4.363 kg) having amino groups at both terminals (Trade name "XTJ-542" manufactured by Suntechno Chemical Co.), and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 6 hours with keeping conditions. Thereafter, hexamethylenediamine (5.0 g) was added into the vessel, and polymerization was conducted for another 2 hours. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=71$ mmol/kg, and the melting point of Tm $=168°$ C.

Example 6

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polyethylene glycol (0.8 kg) having amino groups at both terminals (Trade name "XTJ-504" manufactured by Suntechno Chemical Co.), and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 6 hours with keeping conditions. Thereafter, hexamethylenediamine (3.5 g) was added into the vessel, and polymerization was conducted for another 2 hours. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=58$ mmol/kg, and the melting point of Tm $=168°$ C.

Example 7

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polyethylene glycol (0.8 kg) having amino groups at both terminals (Trade name "XTJ-504" manufactured by Suntechno Chemical Co.), and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 6 hours with keeping conditions. Thereafter, maleic anhydride (3.0 g) was added into the vessel, and polymerization was conducted for another 2 hours. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=1$ mmol/kg, and the melting point of Tm $=168°$ C.

Example 8

Into a pressure vessel (70 L) equipped with an agitator, a thermometer, a torque meter, a manometer, an nitrogen gas inlet, a pressure regulator, and a polymer dispenser, were charged 12-aminododecanoic acid (8 kg), a polyglycol (10.47 kg) having amino groups at both terminals (Trade name "XTJ-542" manufactured by Suntechno Chemical Co.), and adipic acid (1.53 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 8 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 11 kg). Thus obtained polymer had the terminal amino group concentration of $[NH_2]=18.6$ mmol/kg, and the melting point of Tm $=134°$ C.

Example 9

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polypropylene glycol (8 kg) having amino groups at both terminals (Trade name "D-2000" manufactured by Suntechno Chemical Co.), and adipic acid (0.6 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 21 kg). Thus obtained polymer had the terminal amino group concentration of $[NH_2]=31$ mmol/kg, and the melting point of Tm $=161°$ C.

Comparative Example 1

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polyethylene glycol (0.8 kg) having hydroxyl groups at both terminals and having a number average molecular weight of about 150, and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=3$ mmol/kg, and the melting point of Tm $=168°$ C.

Comparative Example 2

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polypropylene glycol (1.5 kg) having hydroxyl groups at both terminals and having a number average molecular weight of about 200, a polytetramethylene glycol (2.8 kg) having hydroxyl groups at both terminals and having a number average molecular weight of about 650, and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=2$ mmol/kg, and the melting point of Tm =165° C.

Comparative Example 3

Into a pressure vessel (70 L) equipped with an agitator, a thermometer, a torque meter, a manometer, an nitrogen gas inlet, a pressure regulator, and a polymer dispenser, were charged 12-aminododecanoic acid (11.2 kg), a polyethylene glycol (1.15 kg) having hydroxyl groups at both terminals and having a number average molecular weight of about 150, and adipic acid (1.12 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 11 kg). Thus obtained polymer had the terminal amino group concentration of $[NH_2]=3$ mmol/kg, and the melting point of Tm =168° C.

Comparative Example 4

Into a pressure vessel (70 L) equipped with an agitator, a thermometer, a torque meter, a manometer, an nitrogen gas inlet, a pressure regulator, and a polymer dispenser, were charged 12-aminododecanoic acid (17 kg), a polypropylene glycol (1.1 kg) having hydroxyl groups at both terminals and having a number average molecular weight of about 200, a polytetramethylene glycol (1.67 kg) having hydroxyl groups at both terminals and having a number average molecular weight of about 650, and adipic acid (0.38 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 7 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=2$ mmol/kg, and the melting point of Tm =174° C.

Comparative Example 5

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polypropylene glycol (1.5 kg) having hydroxyl groups at both terminals and having a number average molecular weight of about 200, a polytetramethylene glycol (2.8 kg) having hydroxyl groups at both terminals and having a number average molecular weight of about 650 and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 6 hours with keeping conditions. Thereafter, hexamethylenediamine (10.0 g) was added into the vessel, and polymerization was conducted for another 2 hours. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=71$ mmol/kg, and the melting point of Tm =168° C.

Comparative Example 6

Into a pressure vessel (70 L) equipped with an agitator, a thermometer, a torque meter, a manometer, an nitrogen gas inlet, a pressure regulator, and a polymer dispenser, were charged 12-aminododecanoic acid (15 kg), a polyethylene glycol (0.8 kg) having hydroxyl groups at both terminals and having a number average molecular weight of about 150, and adipic acid (0.637 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 6 hours with keeping conditions. Thereafter, hexamethylenediamine (7.0 g) was added into the vessel, and polymerization was conducted for another 2 hours. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 13 kg). Thus obtained polymer had the terminal amino group concentration of $[NH_2]=58$ mmol/kg, and the melting point of Tm =168° C.

Comparative Example 7

Into a pressure vessel (70 L) equipped with an agitator, a thermometer, a torque meter, a manometer, an nitrogen gas inlet, a pressure regulator, and a polymer dispenser, were charged 12-aminododecanoic acid (8 kg), a polypropylene glycol (4.1 kg) having hydroxyl groups at both terminals and having a number average molecular weight of about 200, a polytetramethylene glycol (6.7 kg) having hydroxyl groups at both terminals and having a number average molecular weight of about 650 and adipic acid (1.53 kg). After the vessel was sufficiently purged with nitrogen, the vessel was gradually heated from a room temperature to 235° C. over 3 hours with supplying nitrogen gas at a flow rate of 300 L/minute, subsequently the polymerization was conducted for 8 hours with keeping conditions. The pressure in the vessel was adjusted to 0.05 MPa after starting heating. Then, after stopping the agitation, a molten polymer was taken from the polymer dispenser. After water-cooling the molten polymer, the cooled polymer was pelletarized to obtain a pellet (about 11 kg). Thus obtained polymer had the terminal amino group concentration of $[NH_2]=1$ mmol/kg, and the melting point of Tm =134° C.

The results are shown in Table 1.

TABLE 1

| No. | [NH$_2$] (mmol/kg) | $T_m$ (°C.) | TPU | Bonded strength (N/cm) $T_m + 10$(°C.) | $T_m$(°C.) | $T_m - 10$(°C.) |
|---|---|---|---|---|---|---|
| Ex. 1 | 31 | 168 | TPU-01 | 65 | 54 | 38 |
|  |  |  | TPU-02 | 68 | 55 | 35 |
| Ex. 2 | 37 | 165 | TPU-01 | 71 | 57 | 31 |
|  |  |  | TPU-02 | 68 | 61 | 30 |
| Ex. 3 | 23 | 168 | TPU-01 | 61 | 45 | 29 |
|  |  |  | TPU-02 | 62 | 48 | 31 |
| Ex. 4 | 33.5 | 174 | TPU-01 | 52 | 34 | 28 |
|  |  |  | TPU-02 | 45 | 32 | 27 |
| Ex. 5 | 71 | 168 | TPU-01 | 83 | 66 | 45 |
|  |  |  | TPU-02 | 79 | 70 | 48 |
| Ex. 6 | 58 | 168 | TPU-01 | 45 | 35 | 20 |
|  |  |  | TPU-02 | 58 | 50 | 31 |
| Ex. 7 | 1 | 168 | TPU-01 | 40 | 30 | 21 |
|  |  |  | TPU-02 | 39 | 29 | 20 |
| Ex. 8 | 18.6 | 134 | TPU-01 | 48 | 37 | 25 |
|  |  |  | TPU-02 | 45 | 33 | 26 |
| Ex. 9 | 31 | 161 | TPU-01 | 57 | 40 | 27 |
|  |  |  | TPU-02 | 48 | 39 | 27 |
| Com. Ex. 1 | 3 | 168 | TPU-01 | 40 | 25 | 5 |
|  |  |  | TPU-02 | 41 | 24 | 3 |
| Com. Ex. 2 | 2 | 165 | TPU-01 | 22 | 7 | 2 |
|  |  |  | TPU-02 | 18 | 5 | 1 |
| Com. Ex. 3 | 3 | 168 | TPU-01 | 40 | 28 | 15 |
|  |  |  | TPU-02 | 46 | 30 | 18 |
| Com. Ex. 4 | 2 | 174 | TPU-01 | 19 | 5 | 1 |
|  |  |  | TPU-02 | 20 | 6 | 3 |
| Com. Ex. 5 | 71 | 168 | TPU-01 | 40 | 32 | 19 |
|  |  |  | TPU-02 | 39 | 29 | 18 |
| Com. Ex. 6 | 58 | 168 | TPU-01 | 39 | 35 | 20 |
|  |  |  | TPU-02 | 38 | 36 | 21 |
| Com. Ex. 7 | 1 | 134 | TPU-01 | 10 | 5 | 1 |
|  |  |  | TPU-02 | 11 | 3 | 1 |

The invention claimed is:

1. A molded composite article which comprises (Ia) a resin member comprising a polyamide resin and (IIa) a resin member which is directly bonded to the resin member (Ia) and comprises a thermoplastic polyurethane resin, wherein the polyamide resin comprises a polyamide block copolymer containing (A) a polyether segment having at least one terminal —NH— group, and the thermoplastic polyurethane resin comprises a polyester polyurethane obtained from a polyester diol.

2. A molded composite article according to claim 1, wherein the polyamide block copolymer comprises a polyamide elastomer.

3. A molded composite article according to claim 1, wherein the polyether segment (A) is a polyether segment which is a condensate of a polyhydric alcohol having 2 to 8 carbon atoms, and has at least one terminal —NH— group.

4. A molded composite article according to claim 3, wherein the polyhydric alcohol is a straight or branched chain aliphatic polyhydric alcohol having 2 to 4 carbon atoms.

5. A molded composite article according to claim 3, wherein the polyhydric alcohol is a straight or branched chain aliphatic polyhydric alcohol having 2 to 3 carbon atoms.

6. A molded composite article according to claim 1, wherein the polyether segment (A) has a branched chain having a free amino group.

7. A molded composite article according to claim 1, wherein the proportion of the polyether segment (A) is 10 to 90% by weight in the polyamide block copolymer.

8. A molded composite article according to claim 1, wherein the polyamide resin has a free amino group in a concentration of not less than 10 mmol/kg.

9. A molded composite article according to claim 8, wherein the polyamide resin is a resin composition which comprises the polyamide block copolymer containing the polyether segment (A).

10. A molded composite article according to claim 9, wherein the polyamide resin is a resin composition which comprises both the polyamide block copolymer containing the polyether segment (A) and (C) a compound having a free amino group,
    wherein the compound (C) having a free amino group is at least one member selected from the group consisting of a monoamine, a polyamine, a polyamide oligomer and a polyamide resin which is not the polyamide block copolymer.

11. A molded composite article according to claim 10, wherein the proportion of the compound (C) having a free amino group is 0.01 to 20% by weight in the total resin composition.

12. A molded composite article according to claim 1, wherein the thermoplastic polyurethane resin comprises a thermoplastic polyurethane elastomer.

13. A molded composite article according to claim 1, wherein the thermoplastic polyurethane resin comprises, a polyester ether urethane elastomer, and a polycarbonate urethane elastomer.

14. A shoe or a roll comprising the molded composite article according to claim 1.

15. A process for producing a molded composite article recited in claim 1, which comprises
    heating at least one selected from the group consisting of
    (i) the resin member (Ia) and
    (ii) the resin member (IIa) to bond the resin member (Ia) to the resin member (IIa).

16. A production process according to claim 15, which comprises
    heating the thermoplastic polyurethane resin until molten,
    bringing the molten thermoplastic polyurethane resin into contact with at least part of a resin member comprising the polyamide resin to bond the thermoplastic polyurethane resin to the polyamide resin member.

17. A process according to. claim 15, which comprises
    heating the polyamide resin until molten,
    bringing the molten polyamide resin into contact with at least part of a resin member comprising the thermoplastic polyurethane resin to bond the polyamide resin to the thermoplastic polyurethane resin member.

18. A process according to claim 15, which comprises heating both of the polyamide resin and the thermoplastic polyurethane resin until molten,
    bringing the molten polyamide resin into contact with the molten thermoplastic polyurethane resin to bond both resins together.

19. A process according to claim 15, wherein the polyamide resin and the thermoplastic polyurethane resin are bonded together in the molding process by a molding method selected from the group consisting of a heat press molding, a vacuum molding, an injection molding, an extrusion molding, and a blow molding.

* * * * *

UNITED STATES PATENT AND TRADEMARK OFFICE
CERTIFICATE OF CORRECTION

| | | |
|---|---|---|
| PATENT NO. | : 7,740,943 B2 | Page 1 of 1 |
| APPLICATION NO. | : 11/579960 | |
| DATED | : June 22, 2010 | |
| INVENTOR(S) | : Mitsuteru Mutsuda et al. | |

It is certified that error appears in the above-identified patent and that said Letters Patent is hereby corrected as shown below:

On the Title Page:

At item (22), PCT Filed, "May 1, 2005" should read --May 13, 2005--.

At column 32, lines 27-28 (Claim 13, lines 3-4), "polyester ether urethane elastomer, and a polycarbonate urethane elastomer" should read --polyester ether urethane elastomer--.

At column 32, line 44 (Claim 17, line 1), "A process according to. claim 15," should read --A process according to claim 15,--.

Signed and Sealed this
Twenty-ninth Day of May, 2012

David J. Kappos
*Director of the United States Patent and Trademark Office*